United States Patent
Jung

(10) Patent No.: US 7,166,983 B2
(45) Date of Patent: Jan. 23, 2007

(54) POSITION CALCULATION SYSTEM FOR MOBILE ROBOT AND CHARGING-STAND RETURN SYSTEM AND METHOD USING THE SAME

(75) Inventor: Il-kyun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/318,488

(22) Filed: Dec. 28, 2005

(65) Prior Publication Data
US 2006/0238159 A1    Oct. 26, 2006

(30) Foreign Application Priority Data
Apr. 25, 2005    (KR) ...................... 10-2005-0034129

(51) Int. Cl.
G05D 1/00    (2006.01)
(52) U.S. Cl. ................. 318/587; 318/568.12; 318/580; 701/23; 901/1; 180/167
(58) Field of Classification Search ................ 318/587, 318/568.12, 580; 901/1; 180/167; 701/23
See application file for complete search history.

(56) References Cited

U.S. PATENT DOCUMENTS

| | | | | |
|---|---|---|---|---|
| 5,554,914 A | * | 9/1996 | Miyazawa | ............ 318/568.11 |
| 5,576,605 A | * | 11/1996 | Miyazawa | ............ 318/568.12 |
| 5,610,488 A | * | 3/1997 | Miyazawa | ............ 318/568.11 |
| 6,459,955 B1 | * | 10/2002 | Bartsch et al. | ............... 700/245 |
| 6,815,918 B1 | * | 11/2004 | Porat et al. | ............ 318/568.12 |
| 2005/0222713 A1 | * | 10/2005 | Kawabe et al. | ............. 700/259 |

\* cited by examiner

*Primary Examiner*—Rita Leykin
(74) *Attorney, Agent, or Firm*—Birch Stewart Kolasch & Birch, LLP

(57) ABSTRACT

Disclosed herein is a mobile robot which is capable of accurately calculating a position of the wireless signal source using a wireless signal, and allowing the mobile robot to accurately and rapidly return to a charging-stand using the calculated position. The position calculation system for a mobile robot includes: a wireless signal source for outputting a wireless signal continuously or periodically; and a mobile robot which includes a plurality of directional antennas for detecting the wireless signal outputted through the wireless signal source, wherein the mobile robot calculates a direction of the wireless signal source via a rotation angle detected by the directional antennas, and calculates a distance separated from the wireless signal source using a wireless signal detection time difference between the directional antennas.

20 Claims, 6 Drawing Sheets

POSITION CALCULATION SYSTEM FOR MOBILE ROBOT AND CHARGING-STAND RETURN SYSTEM AND METHOD USING THE SAME

BACKGROUND OF THE INVENTION

1. Field of the Invention

The present invention relates to a mobile robot, and more particularly to a position calculation system for a mobile robot and a charging-stand return system and method using the same, wherein, the position calculation system is capable of accurately calculating a position of a wireless signal source using a wireless signal, and the charging-stand return system is capable of allowing the mobile robot to accurately and rapidly return to the charging-stand using the calculated position.

2. Description of the Related Art

A robot, which has been developed as an industrial robot, has been used as a part of the factory automation. In addition, the robot has been used so as to collect or acquire required information as a substitute for a human being in an extreme situation which would be intolerable for a human being. With the application of the robots to the high-tech space development industry, a robotics field has more rapidly developed. Recently, the robotics field has developed a human-friendly domestic robot, and a representative example thereof is a cleaning robot.

A cleaning robot, which is a kind of a mobile robot, is an apparatus for freely moving around a defined cleaning area such as a house or an office, and inhaling dust or impurities. The cleaning robot includes components of a general vacuum cleaner as well as other components. Herein, said other components include a running apparatus for running the cleaning robot, a plurality of sensors for detecting collision of the cleaning robot so as to prevent the cleaning robot from colliding with various obstacles, and a microprocessor for controlling the above-mentioned components of the cleaning robot, etc. The cleaning robot provides power for driving through a battery since it moves freely in the cleaning area.

On the other hand, the cleaning robot has an auto-charging function in order for the convenience of a user. In accomplishing the auto-charging function, the cleaning robot checks the power level remaining in the battery. If the power level remaining in the battery is below a reference value, the cleaning robot automatically returns to a charging-stand which is placed at a predetermined position in the cleaning area, recharges the battery, and restarts a corresponding operation thereof.

However, the conventional charging-stand auto-return method for a cleaning robot is a method for attaching an artificial mark to the charging-stand, determining a position of the charging-stand when the cleaning robot detects the mark attached to the charging-stand through random running, and then allowing the cleaning robot to return to the charging-stand.

In addition, the conventional charging-stand auto-return method has problems that, in order to allow the cleaning robot to detect the artificial mark attached to the charging-stand, the charging-stand must be installed in the same area at which the cleaning robot is placed, and no obstacle between the cleaning robot and the charging-stand is present.

For example, in a case where the charging-stand is placed in a living room while the cleaning robot is placed in a different room, since the cleaning robot cannot detect the artificial mark attached to the charging-stand due to an obstacle such as a wall, it may not be possible to allow the cleaning robot to normally return to the charging-stand.

SUMMARY OF THE INVENTION

Therefore, the present invention has been made in view of the above problems, and it is an object of the present invention to provide a position calculation system for a mobile robot, which is capable of calculating a direction of a wireless signal source by detecting a wireless signal outputted through a wireless signal source via a plurality of directional antennas, and calculating a distance between the wireless signal source and a mobile robot using a wireless signal detection time difference between the directional antennas which detect the wireless signal.

It is another object of the present invention to provide a charging-stand return system and method using the same, which is capable of allowing a mobile robot to more effectively return to a charging-stand using direction information and distance information calculated on the basis of a wireless signal by arranging a wireless signal source in the charging-stand when the mobile robot automatically returns to the charging-stand.

In accordance with an aspect of the present invention, the above and other objects can be accomplished by the provision of a position calculation system for a mobile robot comprising: a wireless signal source for outputting a wireless signal continuously or periodically; and a mobile robot which includes a plurality of directional antennas for detecting the wireless signal outputted through the wireless signal source, wherein, the mobile robot calculates a direction of the wireless signal source via a rotation angle detected by the directional antennas, and calculates a distance separated from the wireless signal source using a wireless signal detection time difference between the directional antennas.

In accordance with another aspect of the present invention, there is provided a system for returning a mobile robot to a charging-stand, the system comprising: a charging-stand for outputting a wireless signal continuously or periodically; and a mobile robot which includes at least two directional antennas for detecting the wireless signal outputted through the charging-stand, wherein, when a power level remaining in a battery of the mobile robot is below a predetermined value, the mobile robot calculates distance information with respect to the mobile robot separated from the charging-stand using a direction of the charging-stand detected by the directional antennas and using a wireless signal detection time difference between the directional antennas, and returns to the charging-stand on the basis of the distance information.

In accordance with yet another aspect of the present invention, there is provided a method for returning a mobile robot to a charging-stand, in which the mobile robot includes a position information calculating unit and a charging-stand return processing unit, the method comprising the steps of: a) detecting a wireless signal using a directional antenna, wherein the wireless signal is outputted from the charging-stand; b) calculating direction information of the charging-stand and distance information between the charging-stand and the mobile robot, and outputting the calculated direction information and distance information, wherein the position information calculating unit calculates the direction information and distance information using the detected wireless signal; and c) returning the mobile robot to the charging-stand, wherein the charging-stand return processing unit allows the mobile robot to return to the charging-stand on the basis of the direction information and distance information outputted through the position information calculating unit.

Therefore, the present invention provides a position calculation system for a mobile robot, wherein, since a mobile robot detects a wireless signal outputted through a wireless signal source, calculates directional information according to the wireless signal source position, and calculates distance information using the wireless signal detection time difference between directional antennas, even though an obstacle is present between the mobile robot and the wireless signal source, it is possible to accurately calculate the wireless signal source position.

In addition, the present invention provides a charging-stand return system and method using the same, wherein, if a wireless signal source is a charging-stand, by calculating directional information and distance information, even though an obstacle is present between the mobile robot and the charging-stand, it is possible to accurately calculate the charging-stand position, and allow the mobile robot to effectively return to the charging-stand when a power level remaining in a battery is low.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
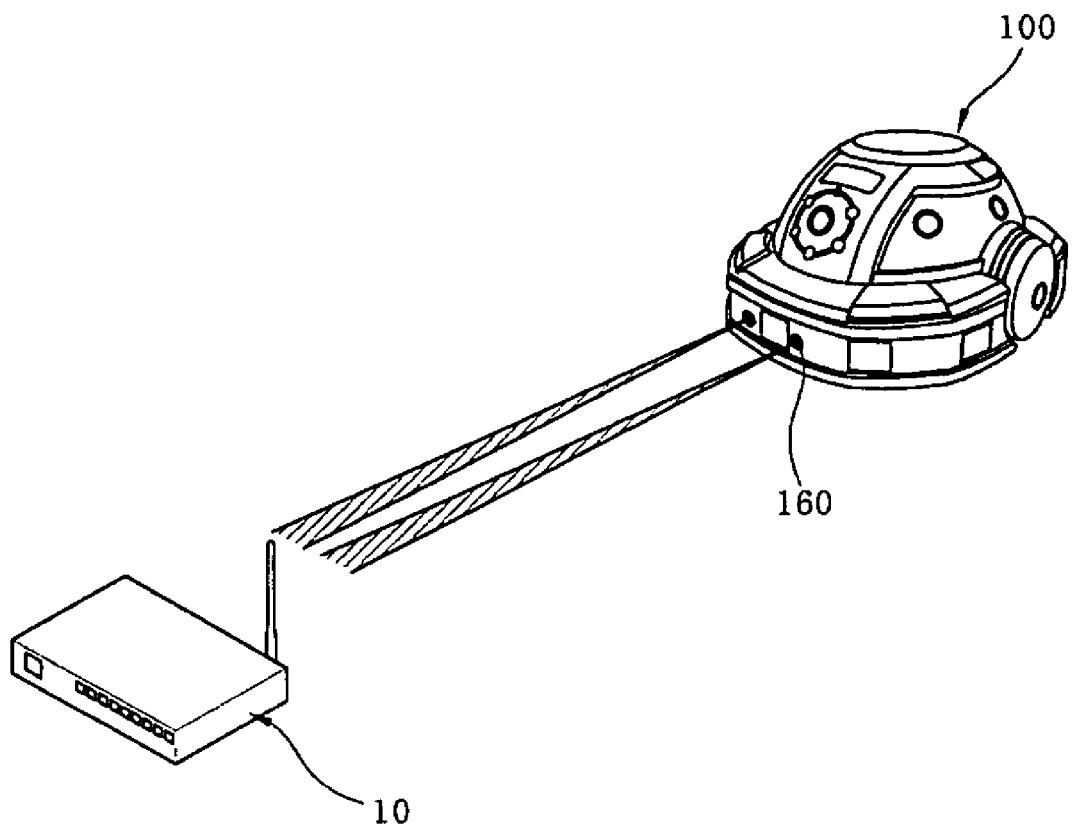
FIG. 1 is a schematic view illustrating a position calculation system for a mobile robot according to a preferred embodiment of the present invention.

FIG. 1 is a schematic view illustrating a position calculation system for a mobile robot according to a preferred embodiment of the present invention.

As shown in this drawing, the position calculation system for the mobile robot according to the preferred embodiment of the present invention includes a wireless signal source 10 arranged at a fixed place, for continuously or periodically outputting a wireless signal, and a mobile robot 100 which includes a plurality of directional antennas 160 for detecting the wireless signal outputted through the wireless signal source 10, wherein, the mobile robot 100 calculates a direction of the wireless signal source 10 via a rotation angle detected by the directional antenna 160, and calculates a distance separated from the wireless signal source 10 using a wireless signal detection time difference between the directional antennas 160.

The wireless signal source 10 is a type of a wireless signal transmission apparatus. For example, the wireless signal source 10 may be an Access Point (AP) used in wireless communication, and is provided together with the mobile robot 100. It is preferred that the wireless signal source 10 is installed at the same height of the directional antenna 160 in order to allow the directional antenna 160 to easily detect the wireless signal source 10, and, for example, the wireless signal source 10 may be a charging-stand of the mobile robot 100. The wireless signal source 10 continuously or periodically outputs the wireless signal with a predetermined frequency bandwidth.

The mobile robot 100 includes at least two directional antennas 160 for detecting the wireless signal outputted through the wireless signal source 10. The mobile robot 100 rotates at a predetermined velocity for each time interval, and detects the wireless signal via the directional antennas 160. In addition, the mobile robot 100 according to the present invention calculates a direction of the wireless signal source 10 and a distance between the mobile robot 100 and the wireless signal source 10 by detecting only the wireless signal via the directional antennas 160. While a conventional system calculates a direction and distance of a wireless signal source on the basis of an intensity of a wireless signal by modeling the overall cases to be attenuated and reflected when a wireless signal passes an obstacle, the system according to the present invention calculates the direction and distance by detecting only the wireless signal. Thus, the system according to the present invention can perform faster operation processing than the conventional system.

Figure 2:
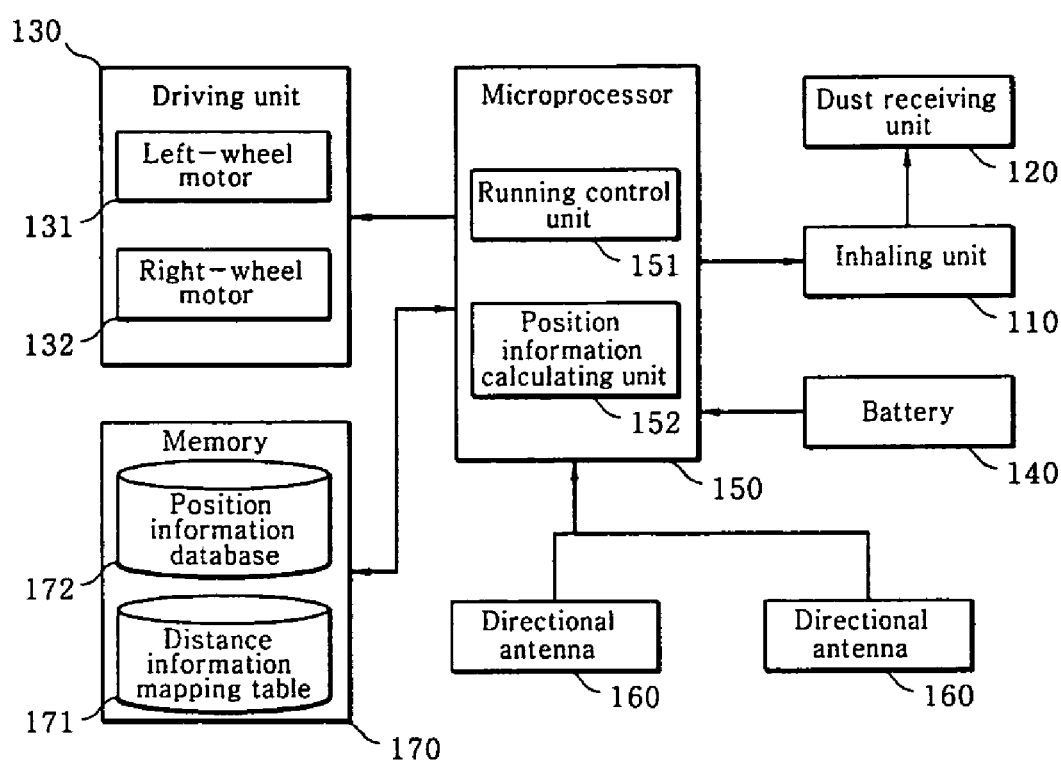
FIG. 2 is a schematic block diagram illustrating the configuration of a cleaning robot as an example of the mobile robot of FIG. 1.

FIG. 2 is a schematic block diagram illustrating the configuration of a cleaning robot as an example of the mobile robot of FIG. 1.

As shown in this drawing, the cleaning robot 100 according to a preferred embodiment of the present invention includes the general basic configuration of a conventional cleaning robot. Besides, the cleaning robot includes: two or more directional antennas 160 for detecting the wireless signal outputted through the wireless signal source 10 of FIG. 1, which are installed at a front side of the cleaning robot 100; a memory 170 for storing an operating program of the cleaning robot 100, which includes a distance information mapping table 171 and a position information database 172, wherein the distance information mapping table 171 is used for mapping the distance information according to a wireless signal detection time difference between the directional antennas 160, and the position information database 172 stores distance information and direction information with respect to the cleaning robot 100 separated from the wireless signal source 10; and a microprocessor 150 for controlling the overall components of the cleaning robot 100, which includes a running control unit 151 for controlling running of the cleaning robot 100 according to a control signal.

To begin with, the general basic configuration of the cleaning robot 100 includes a dust detecting sensor. In addition, the basic configuration of the general cleaning robot further includes an inhaling unit 110 for inhaling dust or impurities detected by the dust detecting sensor; a dust receiving unit 120 for receiving the dust or impurities collected by the inhaling unit 110; a running unit 130 for running the cleaning robot 100 on the basis of an applied control signal, wherein the running unit 130 includes a left-wheel motor 131 and a right-wheel motor 132; a battery 140 for supplying a power voltage to an inhaling unit 110 and a running unit 130; and a microprocessor 150 for controlling the above-mentioned components. A detailed description of the general basic configuration of the cleaning robot will be omitted because it is considered to be well-known.

The directional antenna 160 is an antenna which is designed to have a directional range by forming a beam within a specific angle of direction. In addition, the directional antenna 160 is an antenna which is designed to allow a radio wave to propagate in only a specific direction by attaching a reflection plate to a rear side of an isotropic antenna.

For example, the directional antenna 160 for applying to the present invention may be a beam antenna of which a vertical beamwidth is very narrow, wherein the vertical beamwidth is a half-power beamwidth in a vertical plane. Particularly, it is preferred that a vertical beamwidth of the beam antenna is below 20°. Since the beam antenna regularly arranges a plurality of half wave dipoles in the same plane, and supplies the same power to each dipole, the beam antenna can have a sensitive directional characteristic in a desired direction, and have a high gain.

The directional antenna 160 detects a wireless signal with a predetermined frequency bandwidth which is continuously or periodically outputted through the wireless signal source 10, and transmits the wireless signal to the microprocessor 150.

The memory 170 includes a nonvolatile memory such as an EEPROM (Electrically Erasable and Programmable Read Only Memory), a flash memory, and the like, which is possible to both read and write, and stores the operating program for the driving of the cleaning robot 100 and driving-related data. The memory 170 in accordance with an aspect of the present invention includes a distance information mapping table 171 and a position information database 172, wherein the distance information mapping table 171 is used for mapping the distance information according to a wireless signal detection time difference between the directional antennas 160, and the position information database 172 stores distance information and direction information with respect to the cleaning robot 100 separated from the wireless signal source 10. Access to the data stored in the memory 170 is controlled via the microprocessor 150.

The microprocessor 150 controls the overall components of the cleaning robot 100, and includes: a running control unit 151 for controlling running of the driving unit 130 on the basis of a control signal; and a position information calculating unit 152 for calculating the distance information and direction information of the wireless signal source 10 with respect to the cleaning robot 100, and storing the calculated distance information and direction information in the position information database 172, wherein the position information calculating unit 152 outputs the control signal to the running control unit 151 in order to rotate the cleaning robot 100 at a predetermined velocity for each time interval. At this time, the position information calculating unit 152 calculates the direction information on the basis of a rotation angle of the wireless signal which is detected by the directional antenna 160, calculates the distance information of the cleaning robot 100 by accessing the distance information mapping table 171 so as to acquire the distance information corresponding to the detection time difference of the wireless signals outputted through the directional antennas 160, and stores the calculated directional information and distance information in the position information database 172.

The running control unit 151 controls the running unit 130 for running the cleaning robot 100 according to the control signal outputted through the operating program of the cleaning robot 100.

The position information calculating unit 152 outputs the control signal to the running control unit 151 in order to rotate the cleaning robot 100 at a predetermined velocity, and calculates a position of the cleaning robot 100 for each time interval. Simultaneously, the position information calculating unit 152 outputs a driving command to the directional antennas 160. Thus, the cleaning robot 100 rotates under control of the running control unit 151, and simultaneously, the directional antenna 160 detects the wireless signal and outputs a detection signal according to the detection result.

When the position information calculating unit 152 receives the detection signal from any one of the plurality of directional antennas 160, the position information calculating unit 152 calculates a direction in which the wireless signal source 10 is placed using a rotation angle of the cleaning robot 100. At this time, the calculated direction information is stored in the position information database 172 of the memory 170, and is set to a rotation start direction when calculating a position of the wireless signal source 10 for a next time interval. Thus, by using the previous calculated direction as a reference direction, it is possible to rapidly calculate the position of the wireless signal source 10.

Figure 3:
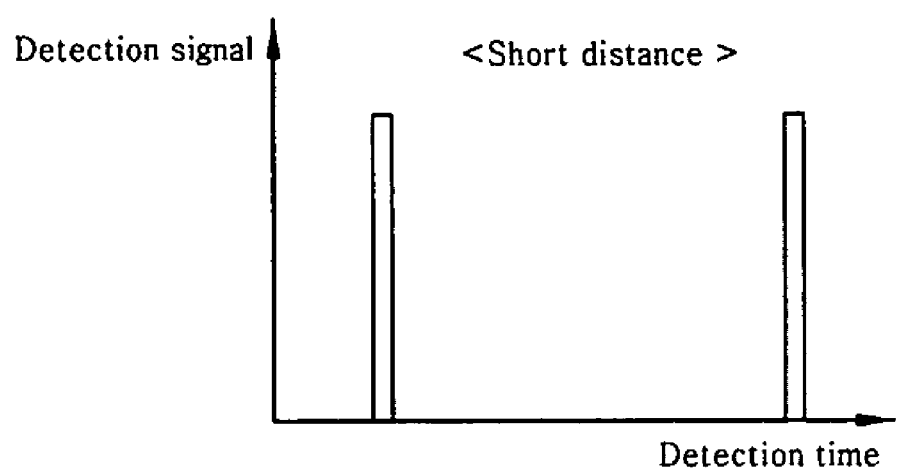
FIG. 3 is a schematic graph illustrating a wireless signal detection time difference for each moving distance between a cleaning robot and a wireless signal source of FIG. 2.
Figure 3:
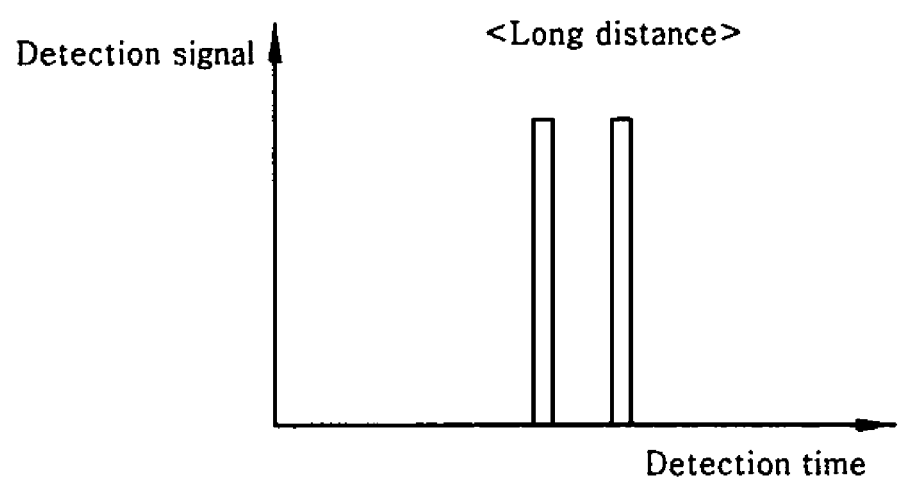

In addition, after the position information calculating unit 152 receives the detection signal from any one of the plurality of directional antennas 160, the position information calculating unit 152 measures the time elapsed till a next directional antenna outputs a detection signal. This is for measuring a distance between the wireless signal source 10 and the cleaning robot 100. Referring to FIG. 3, the detail explanation thereof will be as follows.

FIG. 3 is a schematic graph illustrating a wireless signal detection time difference for each moving distance between a cleaning robot and a wireless signal source of FIG. 2.

As shown in this drawing, when a detection time difference between two detection signals is large, it represents that the wireless signal source 10 is close to the cleaning robot 100. The reason is because a detection area becomes wider when the wireless signal source 10 goes away from the directional antennas 160, and the detection area becomes narrower when the wireless signal source 10 comes near the directional antennas 160. That is, in a short distance, the detection area becomes narrower as electro magnetics energy travels straight, and thereby the time difference of the two detection signals is large.

In addition, when a detection time difference between two detection signals is small, it represents that the wireless signal source 10 is far away from the cleaning robot 100. Since the wireless signal source 10 is far away from the cleaning robot 100, the wireless signal source 10 is detected in the detection area of the directional antennas 160, and thereby the time difference of the two detection signals is small.

In addition, distance information corresponding to the detection time difference received through the directional antennas 160 is calculated via the distance information mapping table 171 of the memory 170. The position information calculating unit 152 calculates the detection time difference received through the directional antennas 160, and accesses to the distance information mapping table 171 of the memory 170 to acquire the distance information corresponding to the detection time difference. Herein, the distance information mapping table 171 is a table which stores values acquired by experiments according to the present invention.

The position information calculating unit 152 stores the direction information and distance information in the position information database 172, wherein the direction of the wireless signal source 10 is calculated via the rotation angle firstly detected by the directional antennas 160 when the cleaning robot 100 rotates, and the distance between the cleaning robot 100 and the wireless signal source 10 is calculated by using the detection time difference between the directional antennas 160.

Since the cleaning robot 100 detects the wireless signal outputted through the wireless signal source 10, calculates the directional information according to the wireless signal source 10 position, and calculates the distance information using the wireless signal detection time difference between the directional antennas 160, even though an obstacle is present between the cleaning robot 100 and the wireless signal source 10, it is possible to accurately calculate the wireless signal source position.

Figure 4:
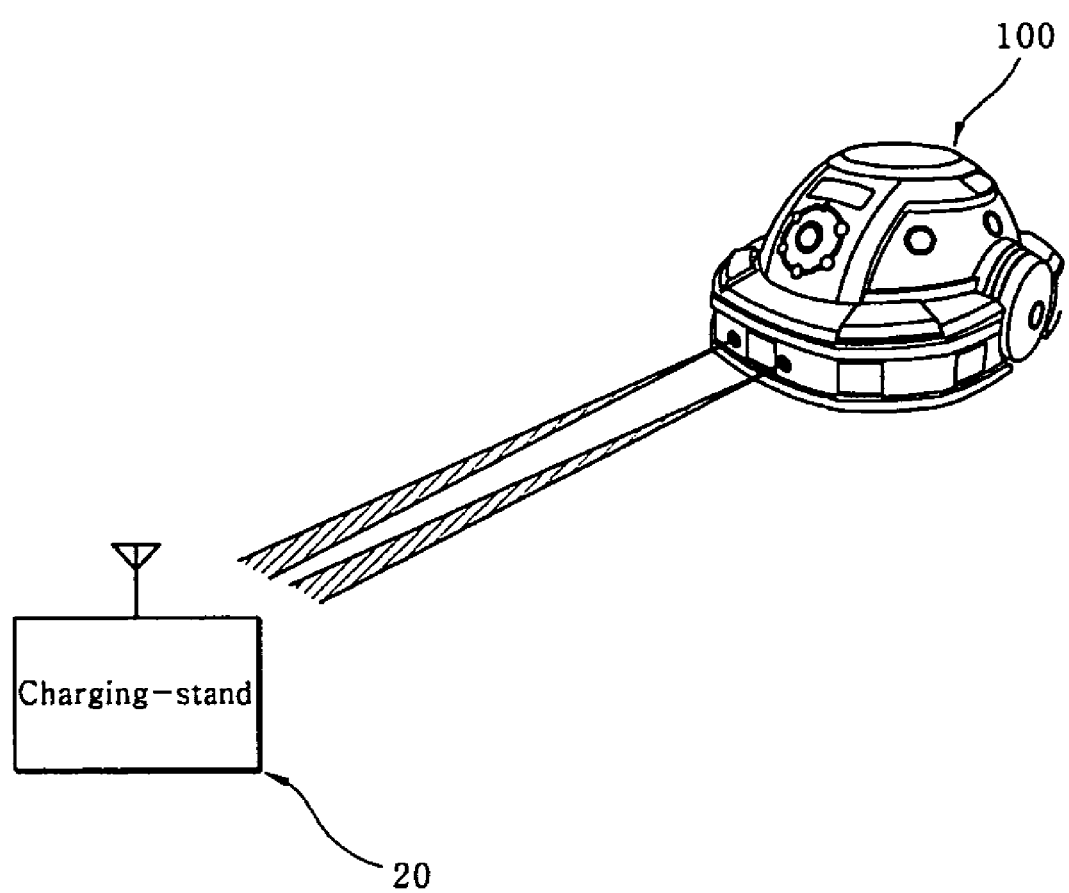
FIG. 4 is a schematic view illustrating a charging-stand return system for a mobile robot according to a preferred embodiment of the present invention.

FIG. 4 is a schematic view illustrating a charging-stand return system for a mobile robot according to a preferred embodiment of the present invention.

As shown in this drawing, the charging-stand return system for a mobile robot according to a preferred embodiment of the present invention includes a charging-stand 20 for outputting a wireless signal continuously or periodically; and a mobile robot 100 which includes a plurality of directional antennas 160 for detecting the wireless signal outputted through the charging-stand 20, wherein, when a power level remaining in a battery 140 of the mobile robot 100 is below a predetermined value, the mobile robot 100 calculates distance information with respect to the mobile robot 100 separated from the charging-stand 20 using a direction of the wireless signal source detected by the directional antenna 160 and using a wireless signal detection time difference between the directional antennas 160, and returns to the charging-stand 20 on the basis of the distance information.

The charging-stand 20 charges the battery 140 which supplies the electric power required for driving the mobile robot 100, and includes a circuit which transmits a wireless signal detected by the directional antennas 160 of the mobile robot 100. The charging-stand 20 continuously or periodically transmits the wireless signal with a predetermined frequency bandwidth. A detailed description of the wireless signal transmitting circuit will be omitted because it is considered to be well-known.

Now, the cleaning robot as a kind of the mobile robot according to the present invention will be explained with reference to FIG. 5.

Figure 5:
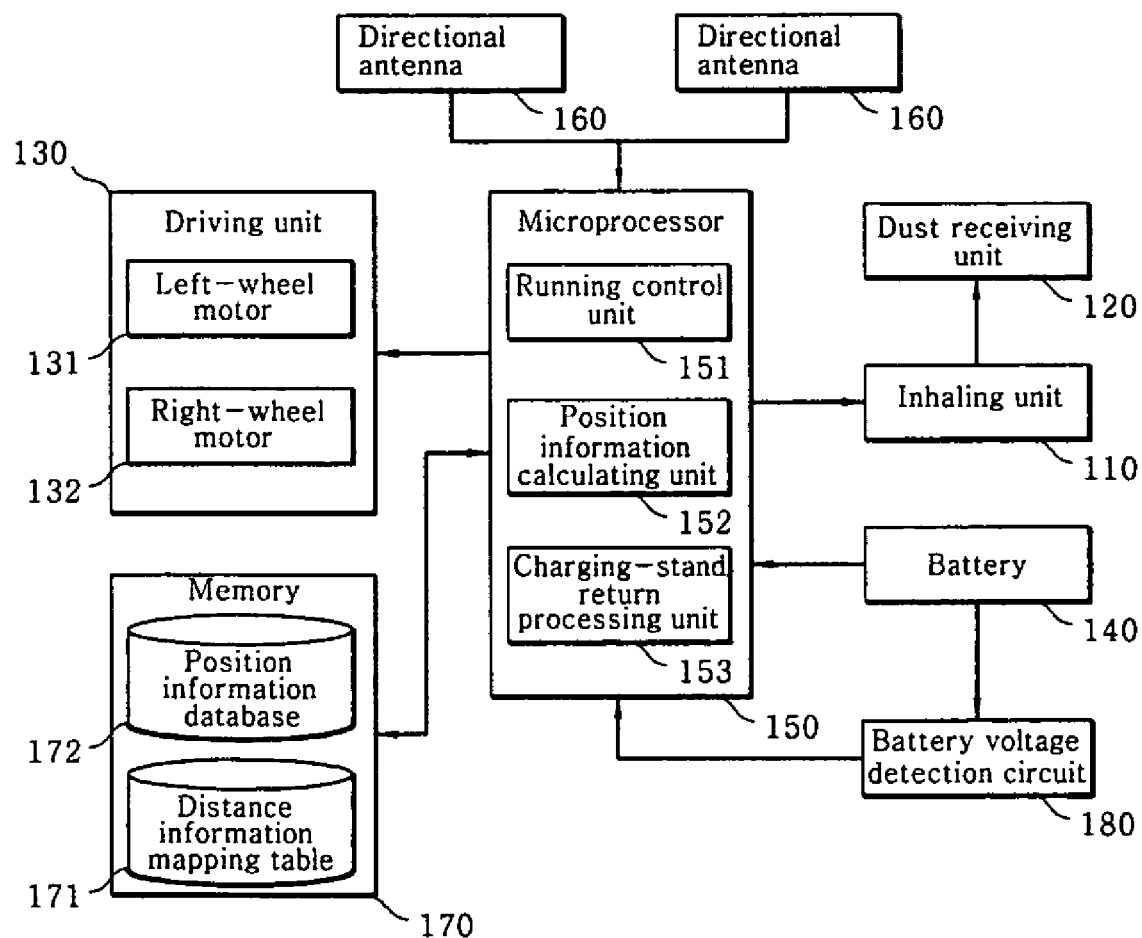
FIG. 5 is a schematic block diagram illustrating the configuration of a cleaning robot as an example of a mobile robot in the charging-stand return system of FIG. 4.

FIG. 5 is a schematic block diagram illustrating the configuration of a cleaning robot as an example of a mobile robot in the charging-stand return system of FIG. 4.

As shown in this drawing, the cleaning robot 100 according to an embodiment of the present invention includes: a driving unit 130, which includes a left-wheel motor 131 and a right-wheel motor 132, for running the cleaning robot 100; a battery voltage detection circuit 180 for detecting a voltage of a battery 140 in the cleaning robot 100 for each time interval, and outputting a charging request signal when the detected battery voltage is below a reference value; a memory 170 for storing an operating program of the cleaning robot 100, and including a distance information mapping table 171 for mapping between the charging-stand 20 and the cleaning table 100 on the basis of the wireless signal detection time difference between the directional antennas 160; and a microprocessor 150 for controlling the overall components of the cleaning robot 100, and including a running control unit 151, a position information calculating unit 152 and a charging-stand return processing unit 153, wherein the running control unit 151 controls running of the driving unit 130 on the basis of a control signal, and the position information calculating unit 152 outputs the control signal to the running control unit 151 in order to rotate the cleaning robot 100 at a predetermined velocity for each time interval when the charging request signal is received, calculates the distance information and direction information of the charging-stand with respect to the cleaning robot 100 which is separated from the charging-stand 20, and outputs the calculated distance information and direction information, and the charging-stand return processing unit 153 outputs a control signal to the running control unit 151 so as to allow the mobile robot to return to the charging-stand on the basis of the calculated distance information and direction information outputted through the position information calculating unit 152.

A detailed description of the same components of FIG. 2 in the construction of the cleaning robot 100 the charging-stand return system according to the present invention will be omitted. That is, the battery voltage detection circuit 180 and the microprocessor 150 of FIG. 5 will be described, wherein the battery voltage detection circuit 180 for detecting the voltage of the battery 140 in the cleaning robot 100 for each time interval, and outputting the charging request signal when the detected battery voltage is below the reference value.

The battery voltage detection circuit 180 divides the voltage applied from the battery 140, via a predetermined resistance ratio, and outputs the divided detection voltage, wherein the battery 140 is embedded in the cleaning robot 100 and supplies a driving voltage to the cleaning robot 100. The microprocessor 150 displays a bar for indicating a power level remaining in the battery 140 according to the level of the detection voltage outputted through the battery voltage detection circuit 180. In addition, the battery voltage detection circuit 180 compares the voltage detected from the battery 140 with a reference voltage value which is enough to drive the cleaning robot 100 and is stored in the memory 170, and outputs the charging request signal to the microprocessor 150 when the detection voltage is below the reference voltage value.

The microprocessor 150 controls the overall components of the cleaning robot 100, and includes the running control unit 151, the position information calculating unit 152 and the charging-stand return processing unit 153, wherein the running control unit 151 controls running of the driving unit 130 on the basis of the control signal, and the position information calculating unit 152 outputs the control signal to the running control unit 151 in order to rotate the cleaning robot 100 at a predetermined velocity for each time interval when the charging request signal is received, calculates the direction information with respect to the cleaning robot 100 which is separated from the charging-stand 20, calculates the detection time difference received through the directional antennas 160, and accesses the distance information mapping table 171 in the memory to acquire the distance information corresponding to the time difference, and outputs the calculated distance information and direction information, and the charging-stand return processing unit 153 outputs a control signal to the running control unit 151 so as to allow the cleaning robot to return to the charging-stand 20 on the basis of the calculated distance information and direction information outputted through the position information calculating unit 152.

The running control unit 151 controls the running unit 130 for running the cleaning robot 100 according to the control signal outputted through the operating program of the cleaning robot 100.

The position information calculating unit 152 receives the charging request signal outputted through the battery voltage detection unit 180, outputs the control signal to the running control unit 151 in order to rotate the cleaning robot 100 at a predetermined velocity, and calculates a position of the cleaning robot 100 for each time interval. Simultaneously, the position information calculating unit 152 outputs a driving command to the directional antennas 160. Thus, the cleaning robot 100 rotates under control of the running control unit 151, and simultaneously, the directional antennas 160 detects the wireless signal and outputs a detection signal according to the detection result.

When the position information calculating unit 152 receives the detection signal from any one of the plurality of directional antennas 160, the position information calculating unit 152 calculates a direction in which charging-stand 20 is placed using a rotation angle of the cleaning robot 100. At this time, the calculated direction information is stored in the position information database 172 of the memory 170, and is set to a rotation start direction when calculating a position of the charging-stand 20 for a next time interval. Thus, by using the previous calculated direction as a reference direction, it is possible to rapidly calculate the charging-stand position.

In addition, after the position information calculating unit 152 receives the detection signal from any one of the plurality of directional antennas 160, the position information calculating unit 152 measures the time elapsed till a next directional antenna outputs a detection signal. This is for measuring a distance between the charging-stand 20 and the cleaning robot 100.

The position information calculating unit 152 calculates the detection time difference received through the directional antennas 160, and access to the distance information mapping table 171 in the memory to acquire the distance information corresponding to the time difference. Herein, the distance information mapping table 171 is a table which stores values acquired by experiments according to the present invention.

The position information calculating unit 152 outputs the direction information and distance information to the charging-stand return processing unit 153, wherein the direction of the charging-stand 20 is calculated via the rotation angle firstly detected by the directional antennas 160 when the cleaning robot 100 rotates, and the distance between the cleaning robot 100 and the charging-stand 20 is calculated by using the detection time difference between the directional antennas 160.

The charging-stand return processing unit 153 outputs a control signal to the running control unit 151 using the calculated distance information and direction information of the charging-stand 20 outputted through the position information calculating unit 152. Thus, the charging-stand return processing unit 153 drives the driving unit 130 according to the control signal inputted to the running control unit 151, and allows the cleaning robot to return to the charging-stand 20.

Thus, since the cleaning robot 100 detects the wireless signal outputted through the charging-stand 20, calculates the directional information according to the charging-stand position, and calculates the distance information using the wireless signal detection time difference between the directional antennas 160, even though an obstacle is present between the cleaning robot 100 and the charging-stand 20, it is possible to accurately calculate the charging-stand position, and allow the cleaning robot 100 to effectively return to the charging-stand 20.

Figure 6:
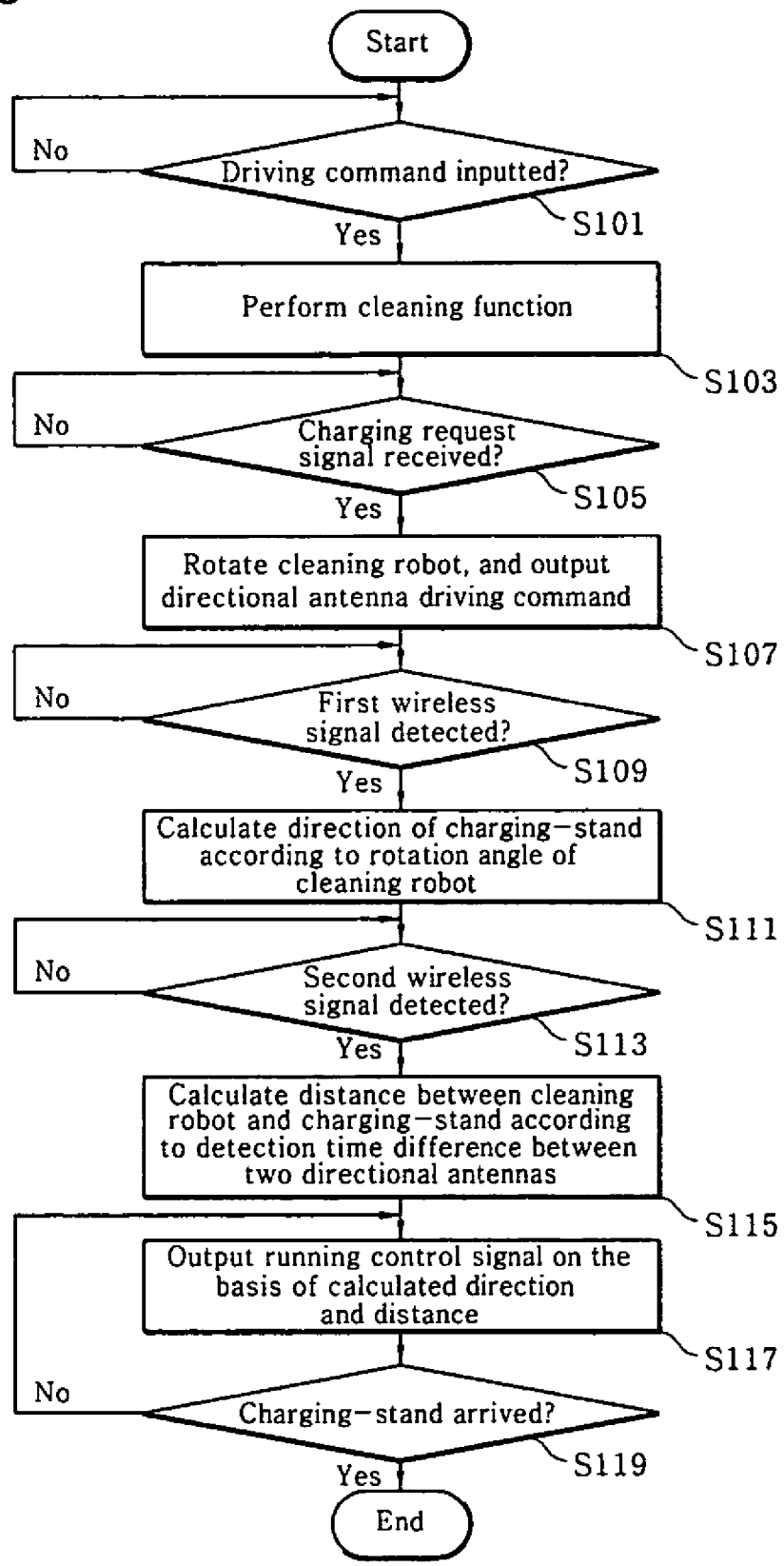
FIG. 6 is a schematic flowchart illustrating a charging-stand return method for a cleaning robot according to a preferred embodiment of the present invention.

FIG. 6 is a schematic flowchart illustrating a charging-stand return method for a cleaning robot according to a preferred embodiment of the present invention.

Referring to FIG. 6, first begin with, when a user inputs a command for driving the cleaning robot 100 which is fully charged, for example, a user enters an input button located on the cleaning robot 100 or an input button of a remote controller (S101), an operating program outputs a control signal to the running control unit 151 according to the driving command. Then, the cleaning robot 100 starts to randomly run in a cleaning area, and performs a cleaning function (S103) by driving the inhaling unit 110.

Next, the battery voltage detection unit 180 of the cleaning robot 100 detects a voltage of the battery 140 for each time interval so as to determine an auto-charging time according to a power level remaining in the battery 140. The battery voltage detection unit 180 compares the detected voltage with a reference voltage value stored in the memory 170, and outputs the charging request signal to the position information calculating unit 152 of the microprocessor 150 when the detected voltage is below the reference voltage value.

The position information calculating unit 152 of the microprocessor 150 determines whether the charging request signal is received (S105), and, when the charging request signal is received, the position information calculating unit 152 outputs a control signal to the running control unit 151, and the running control unit 151 allows the cleaning robot 100 to rotate at a predetermined velocity so as to calculate a position of the cleaning robot 100. In addition, the position information calculating unit 152 outputs a command for driving the directional antennas 160 (S107). Thus, the cleaning robot 100 rotates under control of the running control unit 151, and simultaneously, the directional antennas 160 detects the wireless signal and outputs a detection signal according to the detection result.

When the position information calculating unit 152 receives the detection signal outputted through any one of the directional antennas 160 (S109), the position information calculating unit 152 calculates a direction in which the charging-stand 20 is located using a rotation angle of the cleaning robot 100 (S111).

In addition, after the position information calculating unit 152 receives the detection signal from any one of the plurality of directional antennas 160, the position information calculating unit 152 measures the time elapsed till a next directional antenna outputs a detection signal (S113). This is for measuring a distance between the charging-stand 20 and the cleaning robot 100.

Then, the position information calculating unit 152 calculates the detection time difference received through the directional antennas 160, and accesses the distance information mapping table 171 in the memory 170 to acquire the distance information corresponding to the time difference (S115). Herein, the distance information mapping table 171 is a table which stores values acquired by experiments according to the present invention.

Next, the position information calculating unit 152 outputs the direction information and distance information to the charging-stand return processing unit 153, wherein the direction of the charging-stand 20 is calculated via the rotation angle firstly detected by the directional antennas 160 when the cleaning robot 100 rotates, and the distance between the cleaning robot 100 and the charging-stand 20 is calculated by using the detection time difference between the directional antennas 160 (S117).

Then, the charging-stand return processing unit 153 outputs a control signal to the running control unit 151 using the calculated distance information and direction information of the charging-stand 20 outputted through the position information calculating unit 152. Thus, the charging-stand return processing unit 153 drives the driving unit 130 according to the control signal inputted to the running control unit 151, and allows the cleaning robot to return to the charging-stand 20 (S119).

As apparent from the above description, the present invention provides a position calculation system for a mobile robot, wherein, since a mobile robot detects a wireless signal outputted through a wireless signal source, calculates directional information according to the wireless signal source position, and calculates distance information using the wireless signal detection time difference between directional antennas, even though an obstacle is present between the mobile robot and the wireless signal source, it is possible to accurately calculate the wireless signal source position.

In addition, the present invention provides a charging-stand return system and method using the same, wherein, if the wireless signal source is a charging-stand, by calculating directional information and distance information, even though an obstacle is present between the mobile robot and the charging-stand, it is possible to accurately calculate the charging-stand position, and allow the mobile robot to effectively return to the charging-stand when a power level remaining in a battery is low.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A position calculation system for a mobile robot comprising:
   a wireless signal source for outputting a wireless signal continuously or periodically; and
   a mobile robot which includes a plurality of directional antennas for detecting the wireless signal outputted through the wireless signal source, wherein, the mobile robot calculates a direction of the wireless signal source via a rotation angle detected by the directional antennas, and calculates a distance separated from the wireless signal source using a wireless signal detection time difference between the directional antennas.

2. The position calculation system as set forth in claim 1, wherein the mobile robot comprises:
   a driving unit, which includes a left-wheel motor and a right-wheel motor, for running the mobile robot;
   a memory for storing an operating program of the mobile robot, and storing distance information and direction information with respect to the mobile robot; and
   a microprocessor for controlling running of the mobile robot, calculating position information of the mobile robot and controlling overall components of the mobile robot.

3. The position calculation system as set forth in claim 2, wherein the memory comprises:
   a distance information mapping table for mapping the distance information according to the wireless signal detection time difference between the directional antennas; and
   a position information database for storing the distance information and direction information with respect to the mobile robot separated from the wireless signal source.

4. The position calculation system as set forth in claim 3, wherein the microprocessor comprises:
   a running control unit for controlling running of the driving unit on the basis of a control signal; and
   a position information calculating unit for calculating the distance information and direction information with respect to the mobile robot, and storing the calculated distance information and direction information in the position information database.

5. The position calculation system as set forth in claim 4, wherein the position information calculating unit outputs the control signal to the running control unit in order to rotate the mobile robot at a predetermined velocity for each time interval, wherein, the position information calculating unit calculates the direction information on the basis of a rotation angle of the wireless signal which is detected by the directional antenna, and stores the calculated directional information in the position information database.

6. The position calculation system as set forth in claim 4, wherein the position information calculating unit calculates the distance information by accessing to the distance information mapping table so as to acquire the distance information corresponding to the detection time difference of the wireless signals outputted through the directional antennas, and stores the calculated distance information in the position information database.

7. The position calculation system as set forth in claim 1, wherein the wireless signal source is a charging-stand for the mobile robot.

8. A system for returning a mobile robot to a charging-stand, the system comprising:
   a charging-stand for outputting a wireless signal continuously or periodically; and
   a mobile robot which includes at least two directional antennas for detecting the wireless signal outputted through the charging-stand, wherein, when a power level remaining in a battery of the mobile robot is below a predetermined value, the mobile robot calculates distance information with respect to the mobile robot separated from the charging-stand using a direction of the charging-stand detected by the directional antennas and using a wireless signal detection time difference between the directional antennas, and returns to the charging-stand on the basis of the distance information.

9. The system as set forth in claim 8, wherein the mobile robot comprises:
   a driving unit including a left-wheel motor and a right-wheel motor for running the mobile robot;
   a battery voltage detection circuit for detecting a battery voltage of the mobile robot at a predetermined time interval, and outputting a charging request signal when the detected battery voltage is below a reference value;
   a memory for storing an operating program of the mobile robot, and storing distance information between the charging-stand and the mobile robot; and
   a microprocessor for controlling a running of the mobile robot, calculating a direction of the charging-stand, calculating information for a distance separated from the charging-stand, and controlling overall components of the mobile robot.

10. The system as set forth in claim 9, wherein the memory comprises a distance information mapping table for mapping the distance information between the charging-stand and the mobile robot according to the wireless signal detection time difference between the directional antennas.

11. The system as set forth in claim 10, wherein the microprocessor comprises:
 a running control unit for controlling running of the driving unit on the basis of a control signal;
 a position information calculating unit for calculating the distance information and direction information with respect to the mobile robot which is separated from the charging-stand, and outputting the calculated distance information and direction information; and
 a charging-stand return processing unit for allowing the mobile robot to return to the charging-stand on the basis of the calculated distance information and direction information outputted through the position information calculating unit.

12. The system as set forth in claim 11, wherein the position information calculating unit outputs the control signal to the running control unit in order to rotate the mobile robot at a predetermined velocity for each time interval when a charging request signal is received, wherein, the position information calculating unit calculates the direction information on the basis of a rotation angle of the wireless signal which is detected by the directional antenna.

13. The system as set forth in claim 11, wherein the position information calculating unit outputs the distance information by accessing to the distance information mapping table so as to acquire the distance information corresponding to the detection time difference of the wireless signals outputted through the directional antennas.

14. The system as set forth in claim 11, wherein the charging-stand return processing unit outputs the control signal to the running control unit in order to return the mobile robot to the charging-stand using the direction information and distance information calculated through the position information calculating unit.

15. A method for returning a mobile robot to a charging-stand, in which the mobile robot includes a position information calculating unit and a charging-stand return processing unit, the method comprising the steps of:
 a) detecting a wireless signal using a directional antenna, wherein the wireless signal is outputted from the charging-stand;
 b) calculating direction information of the charging-stand and distance information between the charging-stand and the mobile robot, and outputting the calculated direction information and distance information, wherein the position information calculating unit calculates the direction information and distance information using the detected wireless signal; and
 c) returning the mobile robot to the charging-stand, wherein the charging-stand return processing unit allows the mobile robot to return to the charging-stand on the basis of the direction information and distance information outputted through the position information calculating unit.

16. The method as set forth in claim 15, further comprising the step of: detecting a battery voltage of the mobile robot at a predetermined time interval, and outputting a charging request signal when the detected battery voltage is below a reference value prior to performing Step a).

17. The method as set forth in claim 16, wherein said step a) comprises outputting a control signal to a running control unit in order to rotate the mobile robot at a predetermined velocity for each time interval when the charging request signal is received.

18. The method as set forth in claim 15, wherein said step b) comprises calculating the directional information and the calculated directional information, wherein the position information calculating unit calculates the direction information on the basis of a rotation angle of the wireless signal which is detected by the directional antenna.

19. The method as set forth in claim 15, wherein said step b) comprises calculating the distance information and outputting the calculated distance information, wherein the position information calculating unit outputs the distance information by accessing to a distance information mapping table so as to acquire the distance information corresponding to the detection time difference of the wireless signals outputted through at least two directional antennas.

20. The method as set forth in claim 15, wherein said step c) comprises outputting a control signal to a running control unit in order to return the mobile robot to the charging-stand using the direction information and distance information calculated through the position information calculating unit.

* * * * *